Sept. 26, 1939.　　　　　F. SCHAUM　　　　　2,174,018
BRAKE MECHANISM
Filed Dec. 17, 1937　　　　　2 Sheets-Sheet 1
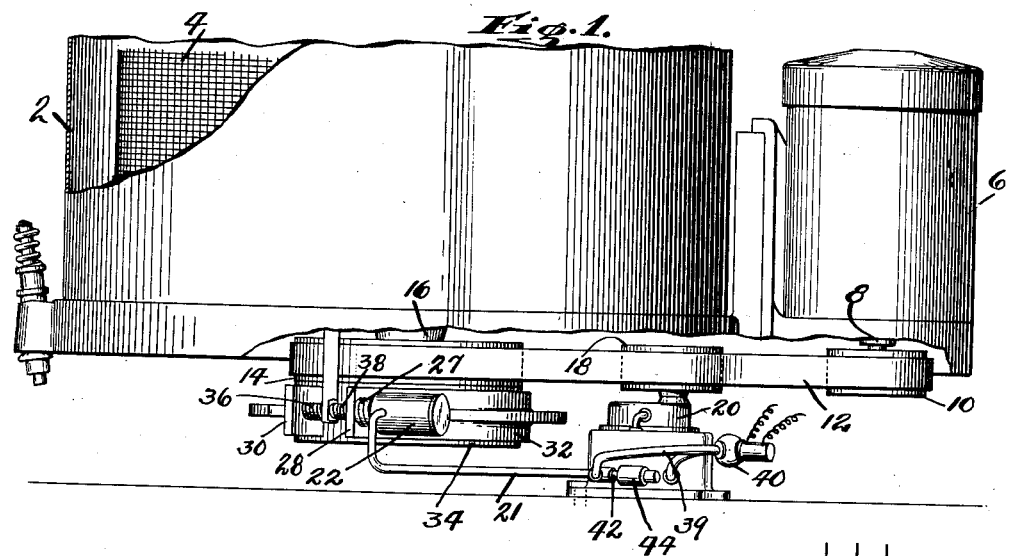
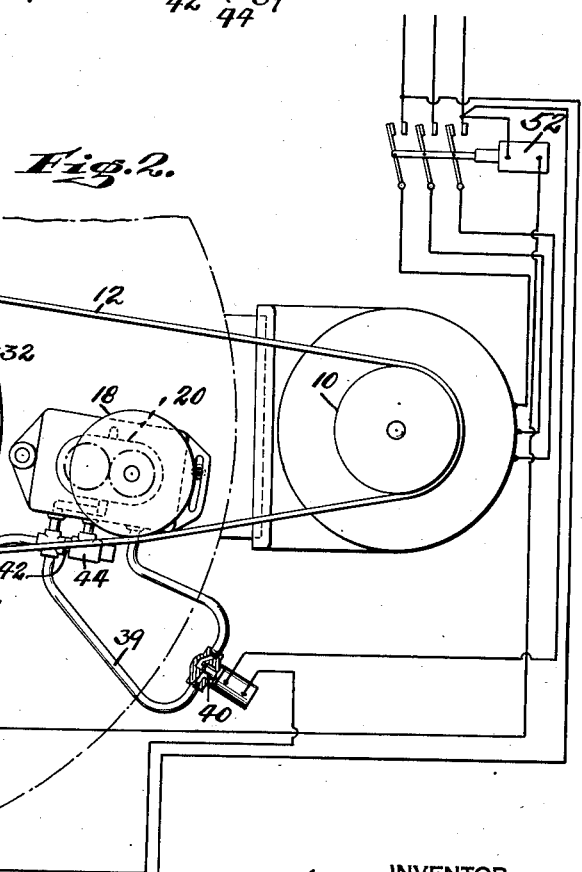
INVENTOR
Fletcher Schaum
BY
Kiddle, Bethell and Montgomery
ATTORNEYS Sept. 26, 1939.   F. SCHAUM   2,174,018
BRAKE MECHANISM
Filed Dec. 17, 1937   2 Sheets-Sheet 2

INVENTOR
Fletcher Schaum
BY
Kiddle, Buhell and Montgomery
ATTORNEYS.

Patented Sept. 26, 1939

2,174,018

UNITED STATES PATENT OFFICE 2,174,018

BRAKE MECHANISM

Fletcher Schaum, Philadelphia, Pa., assignor to Fletcher Works, Incorporated, Philadelphia, Pa., a corporation of Pennsylvania Application December 17, 1937, Serial No. 180,268

6 Claims. (Cl. 192—138)

This invention relates to improvements in brake mechanism and is particularly directed to hydraulic electrically controlled brakes for centrifugal machines.

The present invention has for one of its objects the provision of hydraulic brake mechanism which, as above noted, is electrically controlled, the brake being applied automatically when the circuit for the motor which drives the machine is opened, the brake releasing automatically when the centrifugal comes to rest, so that the centrifugal basket can be manipulated for unloading and recharging.

The device of the present invention is illustrated in the accompanying drawings, in which:

Fig. 1 is an elevational view of my improved device;

Fig. 2 is a bottom plan view thereof including the wiring diagram;

Fig. 3 is a sectional view of a relief valve employed in my device; and

Figure 4:
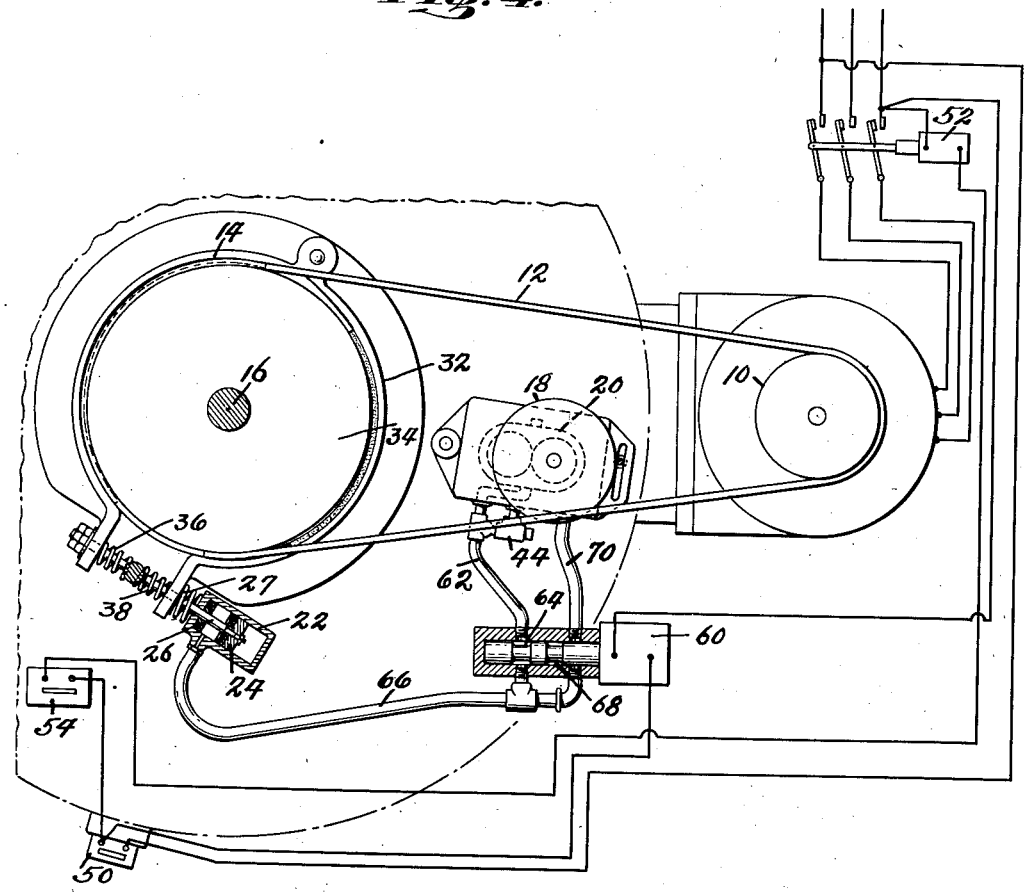
Fig. 4 is a view similar to Fig. 2 of a modified embodiment of my invention.

Referring to the drawings in detail with respect to Figs. 1 to 3, inclusive: 2 designates a centrifugal extractor comprising a basket 4 which is driven by an electric motor 6 located at one side of the machine.

The shaft 8 of the driving motor is provided with a pulley 10 for a belt 12, this belt passing about a pulley 14 on the shaft 16 of the basket 4 whereby the basket is driven.

Intermediate the motor pulley 10 and the basket pulley 14 I provide a rotary oil pump 20, the drive shaft of which is provided with a pulley 18 engaged by the motor belt 12 to drive the pump as the basket 4 is rotating.

A pipe line or conduit designated 21 leads from the discharge side of the pump 20 to a brake cylinder 22. This cylinder is provided with a piston 24 carried by piston rod 26, the latter extending through lugs or ears 28 and 30 on brake shoes 32. The brake shoes 32, as will be appreciated, engage a brake drum 34 provided on the basket shaft 14.

The piston rod 26 carries a pair of coil springs 36 and 38 which lie intermediate the lugs or ears 28 and 30. The piston rod 26 carries another compression spring 27 lying between the lug or ear 28 and the end of the brake cylinder 22.

Branching from the conduit 21 is a conduit 39 which leads to the intake side of the pump 20. This conduit is equipped with a solenoid valve 40. A conduit 42 also branches from conduit 21 and leads back to the intake side of the pump 20. This conduit is equipped with relief valve 44.

50 designates a timer of any well known construction and adapted, when turned on, to close a circuit, and when the duration of the run is completed and the timer mechanism works back to zero, the circuit is interrupted. This timer is in series with the winding of the solenoid valve 40.

52 designates a solenoid operated main switch. Connected in series with the timer 50 and with the winding of the solenoid of the main switch 52 but in shunt to the winding of the solenoid valve 40 is a cover switch 54.

It will be appreciated that with the timer 50 closed a circuit will be closed to the winding of the solenoid valve 40. It will be appreciated further that the mere closing of the cover switch, that is, closure of the cover of the centrifugal, will not effect the closure of any circuit, but that when the timer 50 and cover switch 54 are both closed then the circuit to the winding of the solenoid of the main switch 52 is made.

Assuming that the timer 50 is set and that the cover of the centrifugal is closed to close the cover switch 54, a circuit is completed for the winding of the main switch 52 to close the circuit of the motor 6, while at the same time the winding for the solenoid valve 40 is energized to open this valve.

The centrifugal and the pump 20 are now being driven through the belt 12 and the pump passes oil to the brake cylinder 22 tending to build up pressure therein to actuate the piston 24; but this movement of the piston is resisted by the compression springs 36, 38 and 27 so that the oil takes another path of less resistance through conduit 39, past the open solenoid valve 40 and back to the intake side of the pump. Inasmuch as the latter path offers little or no resistance to the flow of oil no pressure is generated in the system and the machine continues operation until the time for which the timer 50 has been set has elapsed, whereupon the timer opens to break the circuit of the solenoid main switch 52 and the latter opens, thereby opening the circuit of the driving motor 6. The circuit of the solenoid valve 40 is also opened due to the opening of the timer 50. Upon the opening of the circuit of the solenoid valve 40 the valve immediately closes to interrupt the flow of oil through the conduit 39. The cover switch 54 is still closed. While the circuit of the motor 6 has been opened the inertia of the centrifugal basket is sufficient to continue to drive the oil pump 20, and the valve 40 being closed it is evident that pressure will be built up in the brake cylinder 22. This pressure is sufficient to overcome the resistance of the compression springs 27, 36 and 38 forcibly to apply the brake. The spring 27 by now is under maximum compression so that the oil is now returned to the intake side of the pump, past relief valve 44 which has previously been set for the proper pressure.

As the machine slows down due to the application of the brake the pump slows down and the oil pressure built up in the system due to rotation of the pump gradually decreases until the machine has come to rest. The brake, however, is still held in applied position by means of the compression spring 27. This spring will now reexpand, gradually forcing the oil out of the brake cylinder 22 back to the oil pump 20 which is no longer running, the springs 36 and 38 also reexpanding until finally the brake is released. Throughout this operation the cover switch 54 has been kept closed. As above pointed out, however, when this switch is opened it is not possible to close a circuit to the winding of the main switch 52. Consequently one may release the brake quickly if desired when the centrifugal cover is open simply by closing the timer 50 which will close the circuit of the solenoid valve 40, allowing the brake springs to force the oil back to the intake side of the pump, past the valve 40, without, however, starting the motor 6, the circuit of which, as will be appreciated, is open due to the fact that the cover switch 54 is open.

It will be seen from all of the foregoing that I have provided braking mechanism particularly well adapted for centrifugals wherein the hydraulic mechanism is electrically controlled, closing of the motor circuit of the centrifugal opening a valve which permits the brake fluid to be by-passed so that the brake will remain off. The brake is applied when the motor circuit is open which closes the by-pass valve so that pressure to apply the brake can be built up in the system.

In the modification illustrated in Fig. 4 I have provided a two-way solenoid operated valve 60 in place of the valve 40 of the embodiment of my invention already described. When the centrifugal basket is up to speed and the timer 50 shuts off, oil from the pump 20 passes through pipe 62, opening 64 in the two-way solenoid operated valve 60 and pipe 66 to the brake cylinder 22 to build up pressure therein in the same manner as described in connection with the embodiment of my invention illustrated in Figs. 1 and 2. When the brake is completely on the oil will travel from the pump past the relief valve 44, back to the intake side of the pump until the basket stops. The springs 27, 36 and 38 will then force the oil out of the cylinder 22 and back past the opening 64 in the valve 60 and through the pump 20.

If it is desired to release the brake quickly the cover of the centrifugal is opened to open the cover switch 54 and the timer 50 turned on. Inasmuch as the circuit of the solenoid of the main switch 52 cannot be closed unless the cover switch is closed as well as the timer, closing of the timer with the cover switch open will not effect a closure of the main motor circuit but will close the circuit of the winding for the valve 60 to draw the valve to the right from the position shown in the drawing, thereby closing the port 64 and opening the port 68, and the oil in the cylinder 22 can then pass back through the pipe 66, port 68 and pipe 70 to the intake side of the pump.

It is to be understood that various changes may be made in the structures herein illustrated and described without departing from the spirit and scope of my invention.

What I claim is:

1. In combination a centrifugal, a hydraulic brake therefor comprising a brake cylinder, a pump for supplying pressure to said brake cylinder, an electric motor for driving the centrifugal, said pump being incapable of supplying pressure to said brake to apply the same when the circuit of said motor is closed, springs for resisting application of the brake, said springs forcing fluid out of said brake cylinder back through said pump to release the brake after the motor circuit has been opened and the centrifugal has been brought to rest.

2. In combination a centrifugal, a brake therefor comprising a brake cylinder, a pump for supplying fluid to said cylinder and building up pressure therein to apply the brake, a motor for driving the centrifugal, a by-pass for said pump closed when the circuit of said motor is open to permit of the building up of said pressure in the brake cylinder to apply the brake, springs for resisting application of the brake, said springs being operative after the brake has been applied and while said by-pass is closed to force fluid out of said cylindei through said pump to reduce the pressure in the cylinder and release the brake.

3. In combination a centrifugal, a brake therefor comprising a brake cylinder, a pump for supplying fluid under pressure to said cylinder, a motor for driving said centrifugal and pump, a by-pass for said pump, an electric valve for said by-pass adapted to close said by-pass when the circuit of said motor is open to permit said pump to build up pressure in the brake cylinder to apply the brake, springs compressed by the building up of said pressure, and operative to force fluid out of said brake cylinder and back through the pump to release the brake after the centrifugal comes to rest.

4. In combination a centrifugal, a hydraulically applied brake therefor, a pump for supplying pressure to the brake, an electric driving motor, an electric main switch for said motor, a timer switch, a cover switch, a by-pass for said pump, a solenoid valve which when closed closes said by-pass, said timer switch and solenoid valve being connected in series, said cover switch and main switch being connected in series with each other and in shunt to said valve.

5. In combination a centrifugal, a hydraulically applied brake therefor, a pump for supplying pressure to the brake, an electric driving motor, an electric main switch for said motor, a timer switch, a cover switch, a by-pass for said pump, a solenoid valve which when closed closes said by-pass, said parts being so arranged that a circuit may be closed to said solenoid valve by the mere closure of said timer, closure of the circuit of said main electric switch necessitating closure of the timer switch and cover switch.

6. In combination a centrifugal, a hydraulic brake system therefor comprising a brake cylinder, a pump for supplying pressure to said brake cylinder, an electric motor for driving the centrifugal, said pump being incapable of supplying pressure to said brake to apply the same when the circuit of said motor is closed, compressible means placed under pressure in the application of the brake, said means forcing the fluid of the brake system back through said pump to release the brake after the centrifugal has been brought to rest upon the application of the brake and after the motor circuit has been opened.

FLETCHER SCHAUM.